Sept. 27, 1932.  E. A. REUSSENZEHN  1,879,496
PLATFORM FOR SCALES
Filed Aug. 7, 1931

INVENTOR.
E. A. Reussenzehn
BY
ATTORNEYS.

Patented Sept. 27, 1932

1,879,496

UNITED STATES PATENT OFFICE

ERNEST ALBERT REUSSENZEHN, OF DAYTON, OHIO, ASSIGNOR TO DAYTON SCALE COMPANY, OF DAYTON, OHIO, A CORPORATION OF NEW JERSEY

PLATFORM FOR SCALES

Application filed August 7, 1931. Serial No. 555,725.

This case relates to a platform for a weighing scale or the like.

The object of the invention is to provide improved means for securing a platter to its supporting spider.

Further and other objects and advantages will be hereinafter set forth in the accompany specification and claims, and shown in the drawing, which by way of illustration shows what is now considered to be the preferred embodiment of the invention.

Figure 1:
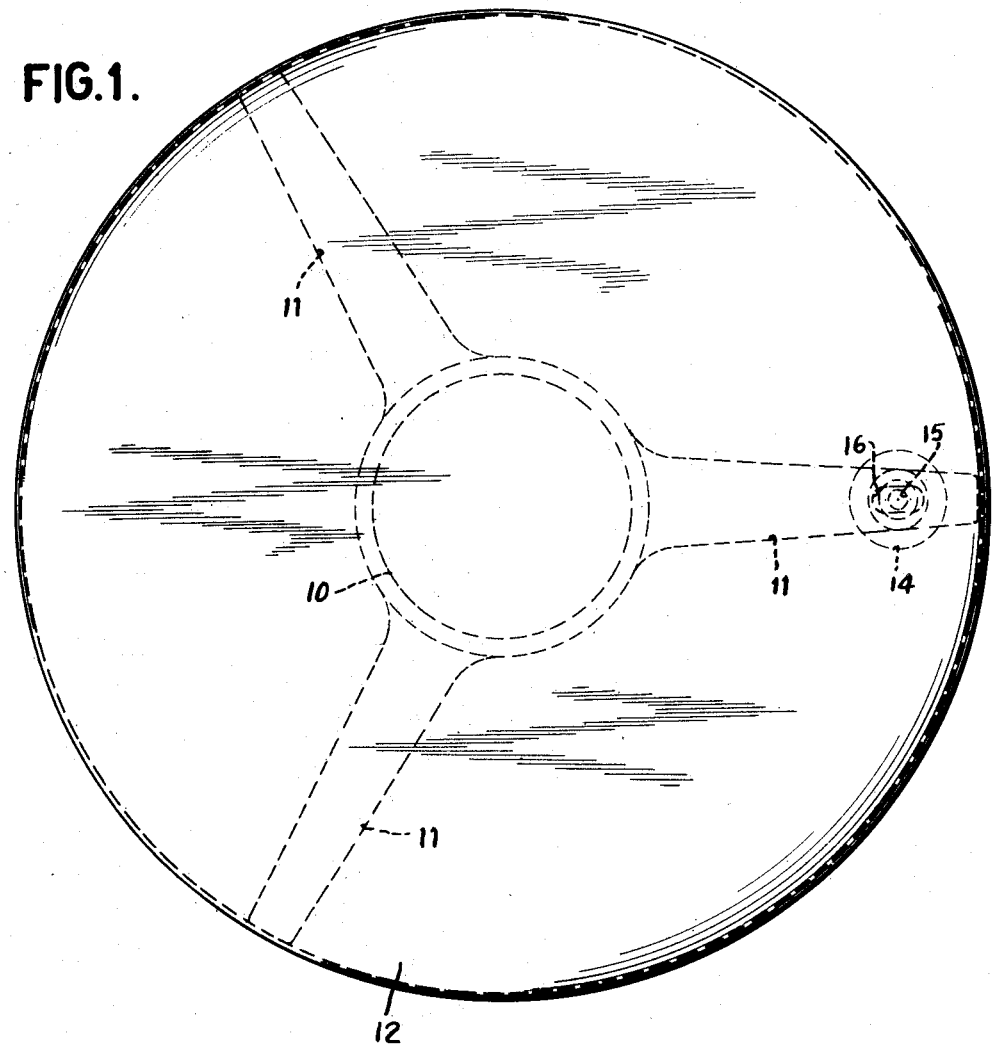
Fig. 1 is a top view of the platter and its carrying spider.
Figure 2:
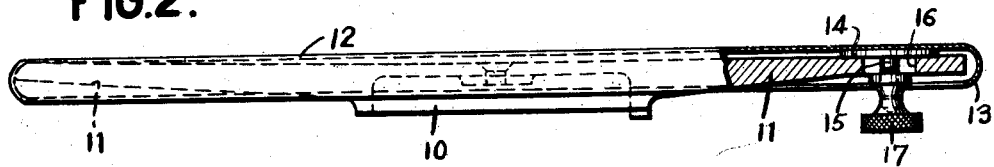
Fig. 2 is a side view partially in section.

In detail, the spider 10 has three legs 11, and is adapted to be carried centrally by the base lever system of a scale in the manner shown in Patent No. 1,680,683. The platter 12 is of stamped sheet metal provided with a depending flange 13 which overlaps the sides of spider 10 and conceals the spider from view. To the under surface of the top of platter 12 is welded a stud 14 integral with a depending screw 15. The screw passes through an elongated slot 16 in one of the legs 11 of the spider. The platter is mounted on the spider and then moved in the direction of said elongated slot 16 to cause the flange 13 to abut the free ends of those legs 11 opposite the leg 11 in which is provided slot 16. A nut 17 is then threaded on the screw 15 and clamped against the bottom of the leg 11 which is provided with the slot. In this manner the platter is secured adjustably to the spider 10. By means of this arrangement the platter may be easily assembled on this carrying spider and may be secured to spiders of different sizes.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

1. In a scale, a spider having a plurality of legs, one of said legs having an elongated slot, and a platter superimposed on said spider and having a depending flange concealing the spider from view, said platter being provided with a depending screw passing through said elongated slot, the platter being adjustable on said spider along said slot, and a nut threaded on said screw and engaging the spider to secure the platter in place.

2. In a scale, a support, a platter mounted on said support and having a depending flange overhanging the sides of the support and substantially concealing the support from view, said support being provided with an elongated slot, said platter carrying depending means for engaging the bottom of the support and adjustably securing a platter to the support.

3. In a scale, a support provided with radially extending legs, one of said legs being provided with a slot and a platter overlying the support and provided with a depending flange for substantially concealing the support from view, said platter being provided with a depending screw passing through said slot, and a nut threaded on the screw for clamping the platter to the support.

In testimony whereof I hereto affix my signature.

ERNEST ALBERT REUSSENZEHN.